(12) United States Patent
Kondoh

(10) Patent No.: US 7,260,878 B2
(45) Date of Patent: Aug. 28, 2007

(54) BALL JOINT

(75) Inventor: Yasuhiro Kondoh, Toyohashi (JP)

(73) Assignee: Usashi Seimitsu Kogyo Kabushiki, Aichi-Ken (JP)

( * ) Notice: Subject to any disclaimer, the term of this patent is extended or adjusted under 35 U.S.C. 154(b) by 144 days.

(21) Appl. No.: 11/345,131

(22) Filed: Feb. 1, 2006

(65) Prior Publication Data

US 2006/0127168 A1    Jun. 15, 2006

Related U.S. Application Data

(62) Division of application No. 10/279,270, filed on Oct. 24, 2002, now Pat. No. 7,040,833.

(30) Foreign Application Priority Data

Oct. 29, 2001   (JP)   ............... 2001-330410

(51) Int. Cl.
*B23P 11/00* (2006.01)
*F16C 11/06* (2006.01)
(52) U.S. Cl. ............... 29/441.1; 29/447; 29/450; 29/451; 29/898.09; 29/898.13
(58) Field of Classification Search ............ 403/56, 403/96, 122, 124, 125, 126, 137, 149, 132–135, 403/140–143; 280/86.756; 29/441.1, 446, 29/447, 450, 451, 898.04, 898.043, 898.07, 29/898.09, 898.1, 898.13
See application file for complete search history.

(56) References Cited

U.S. PATENT DOCUMENTS 3,225,420 A * 12/1965 Sullivan, Jr. ........... 29/898.043
3,856,423 A * 12/1974 Uchida .................... 403/140
3,999,872 A * 12/1976 Allison .................... 403/135
4,003,666 A *  1/1977 Gaines et al. ............. 403/36
4,076,344 A *  2/1978 Gaines et al. ............ 384/213
4,286,363 A    9/1981 Morin
4,318,627 A    3/1982 Morin
4,430,016 A    2/1984 Matsuoka et al.
4,577,988 A    3/1986 Gollub et al.
4,616,387 A * 10/1986 Smith, Jr. ............... 29/898.05
4,695,181 A *  9/1987 Rahmede et al. ......... 403/135

(Continued)

FOREIGN PATENT DOCUMENTS

JP    55-161916    12/1980

(Continued)

OTHER PUBLICATIONS

English translation of JP 55-161916 dated 1980.

(Continued)

*Primary Examiner*—Essama Omgba
(74) *Attorney, Agent, or Firm*—Ladas and Parry LLP

(57) ABSTRACT

A ball joint includes: a ball stud having a spherical ball part and a shank part extending from the spherical ball part; a bearing cupping the spherical ball part of the ball stud; and a housing holding the bearing therein. The housing is provided with a recess in an inner surface thereof. The bearing deforms to enter into the recess of the housing in such a manner that a space is formed between the bearing and the spherical ball part.

5 Claims, 7 Drawing Sheets

U.S. PATENT DOCUMENTS

| | | | |
|---|---|---|---|
| 4,904,107 A * | 2/1990 | Fukukawa et al. | 403/122 |
| 4,916,788 A * | 4/1990 | Mitoya | 29/898.044 |
| 5,153,976 A * | 10/1992 | Benchaar et al. | 29/436 |
| 5,188,476 A | 2/1993 | Mori | |
| 5,395,176 A | 3/1995 | Zivkovic | |
| 5,509,748 A | 4/1996 | Idosako et al. | |
| 5,564,853 A * | 10/1996 | Maughan | 403/137 |
| 5,653,547 A | 8/1997 | Teramachi et al. | |
| 5,782,574 A | 7/1998 | Henkel | |
| 5,813,789 A | 9/1998 | Prickler et al. | |
| 6,139,788 A | 10/2000 | Dorr | |
| 6,152,640 A | 11/2000 | Oda et al. | |
| 6,254,114 B1 | 7/2001 | Pulling et al. | |
| 7,040,833 B2 * | 5/2006 | Kondoh | 403/140 |
| 2005/0013657 A1 * | 1/2005 | Kondoh | 403/122 |
| 2005/0105961 A1 * | 5/2005 | Kondoh | 403/122 |

FOREIGN PATENT DOCUMENTS

| | | |
|---|---|---|
| JP | 59-103921 | 7/1984 |
| JP | 2003130038 A * | 5/2003 |
| WO | 01/02741 | 1/2001 |

OTHER PUBLICATIONS

English translation of JP 59-103921 dated Jul. 12, 1984.
Anter Corporation, Graph of Linear Thermal Expansion of Selected Material (Anter Corporation), www.anter.com/thermaldata.htm, Jul. 1997.

* cited by examiner

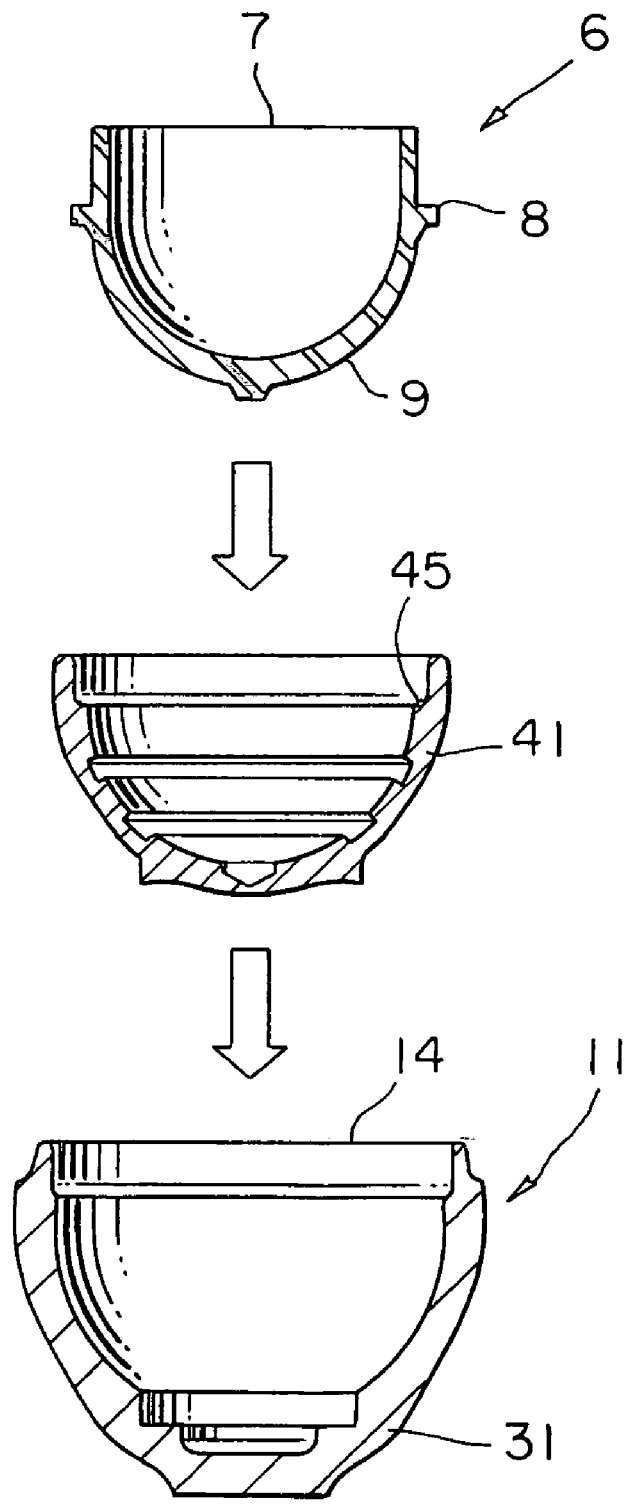
F I G. 3

ID BALL JOINT

This application is a divisional of application Ser. No. 10/279,270 filed on Oct. 24, 2002, now U.S. Pat. No. 7,048,833 and claims the benefit thereof and incorporates the same by reference.

TECHNICAL FIELD

The present invention relates to a ball joint to be used as a joint in a suspension system and/or a steering system of an automobile.

BACKGROUND ART

A conventional ball joint has been prevailingly used as a joint in a suspension system and/or a steering system of an automobile. As shown in FIG. 10, the conventional ball joint includes: a ball stud 102 having a spherical ball part 104 and a shank part 103 extending from the spherical ball part 104; a bearing 106 made of a synthetic resin, cupping the spherical ball part 104 of the ball stud 102 in such a manner that the spherical ball part 104 is able to turn and rock therein, and having an open part 107 in one end; a substantially cup-shaped housing 111 holding the bearing 106 therein and having an open part 114 through which the shank part 103 of the ball stud 102 projects; an annular retaining ring 122 fitted in an opening defined by the open part 114 of the housing 111; and an elastic rubber boot 116 having a small open part 118 fitted on the shank part 103 of the ball stud 102, and a large open part 117 fitted on the retaining ring 122.

The inner surface of the bearing 106 is coated with grease in order to ensure smooth turning and rocking of the spherical ball part 104 of the ball stud 102 in the bearing 106. Generally, the inside diameter of the bearing 106 is substantially equal to the outside diameter of the spherical ball part 104. Therefore, the grease on the inner surface of the bearing 106 may be forced to flow outside through the open part 107 by the spherical ball part 104 when the spherical ball part 104 is pressed into the bearing 106. Consequently, a quantity of the grease in the bearing 106 may be reduced, that is, the bearing 106 may become unable to hold a necessary and sufficient quantity of the grease. In the case, the spherical ball part 104 may be unable to smoothly turn and rock.

In addition, torque necessary for the ball stud 102 to turn and rock is affected by a load exerted by the bearing 106 on the spherical ball part 104. In the ball joint 101 shown in FIG. 10, the entire inner surface of the bearing 106 is in contact with the spherical ball part 104 of the ball stud 102, so that the load is exerted by the entire inner surface of the bearing 106 on the spherical ball part 104. Therefore, higher torque tends to be necessary for the ball stud 102 to turn and rock.

FIG. 11 shows a ball joint 201 proposed to solve the foregoing problem. A bearing 206 included in the ball joint 201 is provided with a circumferential groove 209 in an inner surface thereof. The circumferential groove 209 serves as a grease holding means.

However, when the circumferential groove 209 is formed beforehand in the inner surface of the bearing 206, flow of the grease is obstructed by contacting portions between the spherical ball part 204 and the inner surface of the bearing 206, as shown in FIG. 12. Consequently, the grease may remain only in the circumferential groove 209, so that the grease may be unable to satisfactorily lubricate a desired wide range.

DISCLOSURE OF THE INVENTION

Accordingly, it is an object of the present invention to solve the aforesaid problems and to provide a ball joint wherein a ball stud therein is satisfactorily lubricated and less torque is necessary for the ball stud to rock and turn.

This invention is a ball joint comprising: a ball stud having a spherical ball part and a shank part extending from the spherical ball part; a bearing cupping the spherical ball part of the ball stud; and a housing holding the bearing therein; wherein the housing is provided with a recess in an inner surface thereof, and the bearing deforms to enter into the recess of the housing in such a manner that a space is formed between the bearing and the spherical ball part.

According to the feature, a contacting area between the spherical ball part and the inner surface of the bearing is reduced, so that a load exerted by the bearing on the spherical ball part is reduced. Thus, torque necessary for the ball stud to rock and turn may be lower.

For example, the bearing deforms to enter into the recess of the housing by means of a heat treatment after the ball joint has been assembled. Generally, the bearing is made of a synthetic resin or the like. Therefore, the bearing softens when the ball joint is subjected to a heat treatment. Then, the bearing is preloaded by the spherical ball part and the housing, so that a portion of the bearing easily enters (protrudes) into the recess of the housing. Thus, a space is formed between the bearing and the spherical ball part.

For example, the space may serve as a grease reservoir in which grease is held. In the case, preferably, the space is defined by a gently curved surface. In the case, the grease can be smoothly fed between the spherical ball part and the bearing through the space defined by the gently curved surface. Whereas flow of the grease is intercepted by edges of the circumferential groove in contact with the spherical ball part in the conventional ball joint, flow of the grease is not obstructed in the ball joint of the present invention and thus the grease is able to lubricate the spherical ball part entirely.

Preferably, the recess of the housing consists of a circumferential groove. In the case, a forming operation for the housing is easy, that is, time and labor for the forming operation are not increased so much.

Alternatively, the recess of the housing consists of a plurality of discrete recess-elements. In the case, the number and the positions of the recess-elements may be easily adjusted, so that a desired value of torque can be easily achieved. For example, each of the plurality of recess-elements may consist of a circular depression.

When the recess of the housing is formed in a portion of the housing on a side of the shank part with respect to an equator of the spherical ball part, grease is supplied to the portion on the side of the shank part of the inner surface of the bearing, for improved lubrication at the portion, more than supplied to a portion on a side opposite to the shank part of the inner surface of the bearing. This manner is effective in a ball joint to which a pulling load may be applied.

When the recess of the housing is formed in a portion of the housing on a side opposite to the shank part with respect to an equator of the spherical ball part, grease is supplied to the portion on the side opposite to the shank part of the inner surface of the bearing, for improved lubrication at the portion, more than supplied to a portion on a side of the shank part of the inner surface of the bearing. This manner is effective in a ball joint to which a pressing load may be applied.

BRIEF DESCRIPTION OF THE DRAWINGS

FIG. 3 is a sectional front elevation of assistance in explaining a first stage of work for assembling the ball joint shown in FIG. 1;

BEST MODE FOR CARRYING OUT THE INVENTION

Preferred embodiments of the present invention will be described hereinafter with reference to FIGS. 1 to 9.

Figure 1:
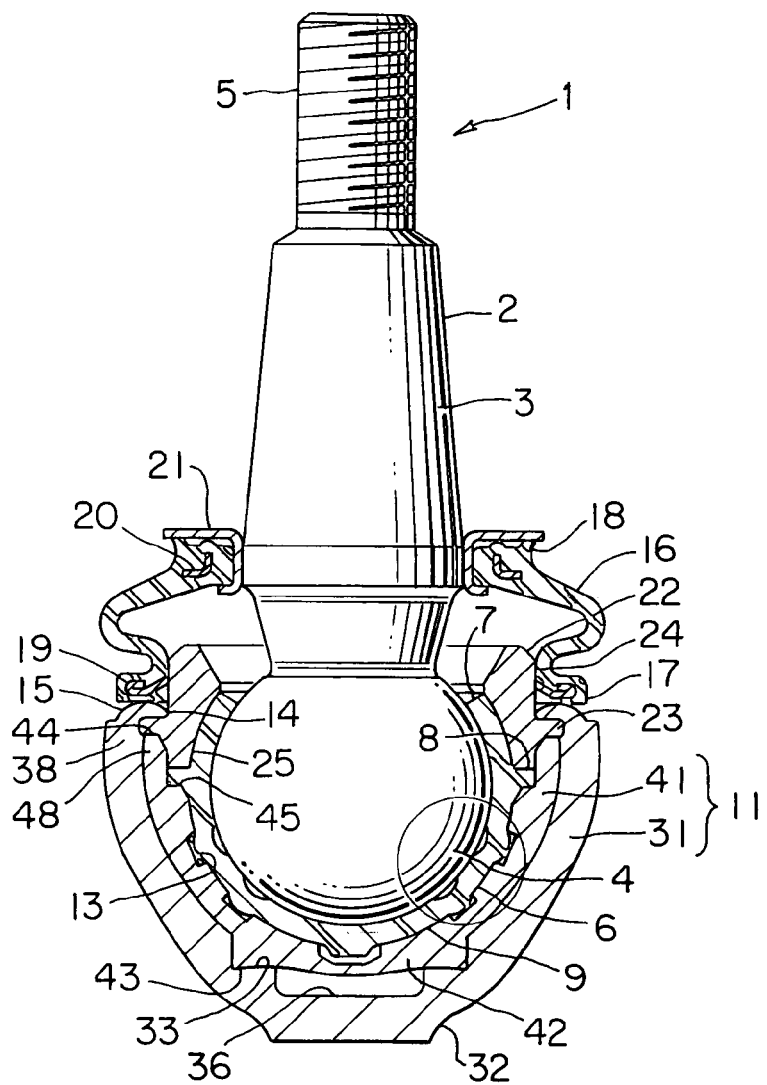
FIG. 1 is a partly sectional front elevation of a ball joint in a first embodiment according to the present invention.

FIG. 1 shows a ball joint 1 in a first embodiment according to the present invention. The ball joint 1 includes a ball stud 2 having a shank part 3 with a thread 5 on one end thereof and a spherical ball part 4 extending from the other end of the shank part 3. A bearing 6 cups the spherical ball part 4 of the ball stud 2 in such a manner that the spherical ball part 4 is able to rock and turn therein. The bearing 6 has: a bearing open part 7 in one end thereof to allow the spherical ball part 4 and the shank part 3 to rock; and a hemispherical bottom 9 in the other end thereof. The bearing 6 is cupped (housed) in a housing 11. A housing open part 14 is formed in one end of the housing 11 corresponding to the bearing open part 7.

The housing 11 has an outer cup 31 made of a soft light metal, such as aluminum. In addition, the housing 11 also has an inner cup 41 made of a hard metal, such as a steel. The inner cup 41 is fitted in the outer cup 31 to enhance the strength of the housing 11.

The outer cup 31 has a holding part 15 to be bent toward the axis of the outer cup 31 in an end part 38 on the side of the housing open part 14, and a closed outer bottom part 32 on the other side. An air space 36 is formed in an inner surface of the outer bottom part 32. A support surface 33 extends substantially perpendicularly to the axis of the shank part 3 from an edge of the air space 36.

The inner cup 41 has an end part 48 having a support surface 44 on the side of the housing open part 14, and a closed inner bottom part 42 on the other side. An outer end surface 43 to be joined to the support surface 33 of the outer cup 31 is formed in a peripheral part of the inner bottom part 42 so as to extend substantially perpendicularly to the axis of the shank part 3.

When the inner cup 41 is fitted in the outer cup 31, the outer end surface 43 of the inner cup 41 is seated on the support surface 33 of the outer cup 31.

A step 45 is formed in the inner surface of the inner cup 41 at a portion near the support surface 44 of the inner cup 41. A flange 8 formed on the outer surface of the bearing 6 is seated on the step 45. A flange 23 formed in the outer surface of an annular retaining ring 22 fitted in the housing open part 14 is seated on the support surface 44.

Figure 2:
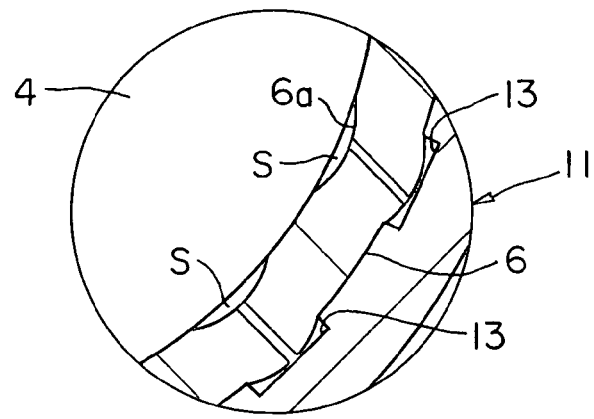
FIG. 2 is an enlarged view of an essential part of the ball joint shown in FIG. 1.

The inside diameter of the inner cup 41 of the housing 11 is slightly smaller than the outside diameter of the bearing 6. The inner cup 41 is provided in its inner surface with two circumferential grooves (recesses) 13 on the side of the inner bottom part 42, that is, on the side opposite to the shank part 3, with respect to an equator of the spherical ball part 4 of the ball stud 2. Portions of the outer surface of the bearing 6 are deformed so as to enter (protrude) into the grooves 13. As shown in FIG. 2, spaces S are formed between the spherical ball part 4 of the ball stud 2 and the bearing 6 at substantially the same levels as the grooves 13 of the housing 11 with respect to a direction perpendicular to the axis of the shank part 3.

The retaining ring 22 has an inner curved surface 25 with a curvature equal to that of the outer surface at a portion near the bearing open part 7 of the bearing 6. The retaining ring 22 has a circumferential wall 24 axially extending on the upper and the lower side of the flange 23. An elastic rubber boot 16 is fitted on the circumferential wall 24. More concretely, a large open part 17 internally provided with a reinforcing ring 19 of the rubber boot 16 is put on and fastened to the circumferential wall 24 of the retaining ring 22, and a small open part 18 internally provided with a reinforcing ring 20 and covered with a ferrule 21 having an L-shaped cross section is fastened to the shank part 3 of the ball stud 2.

A method of assembling the ball joint 1 will be described.

Figure 4:
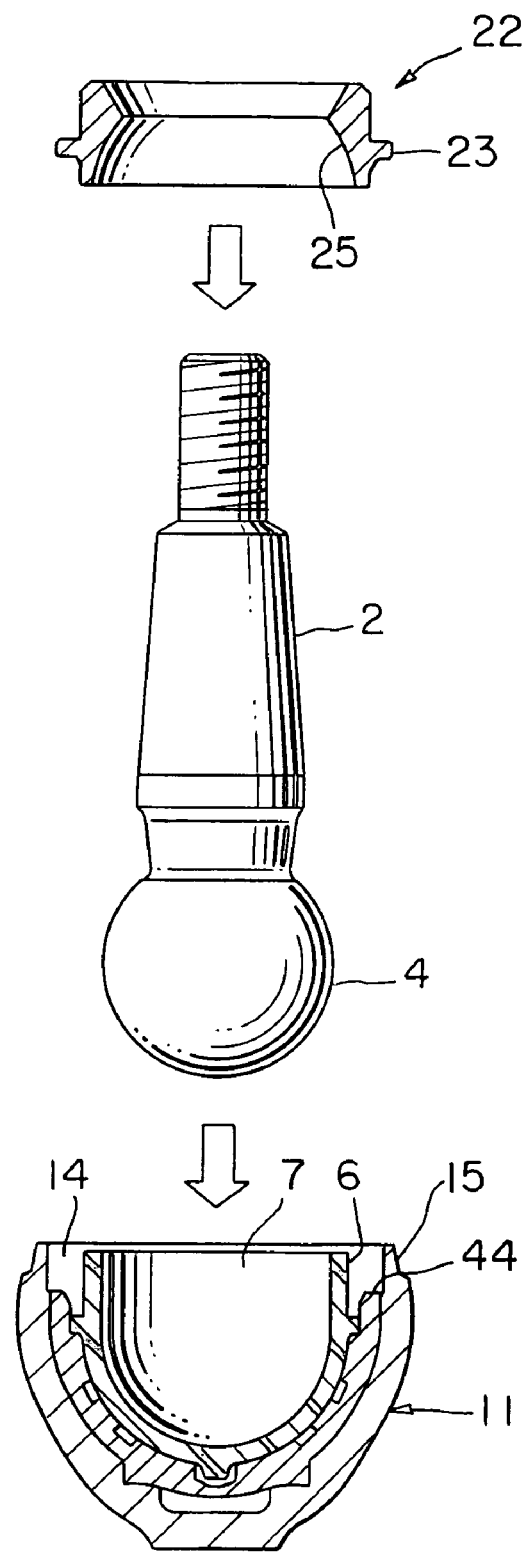
FIG. 4 is a sectional front elevation of assistance in explaining a second stage of work for assembling the ball joint shown in FIG. 1.
Figure 5:
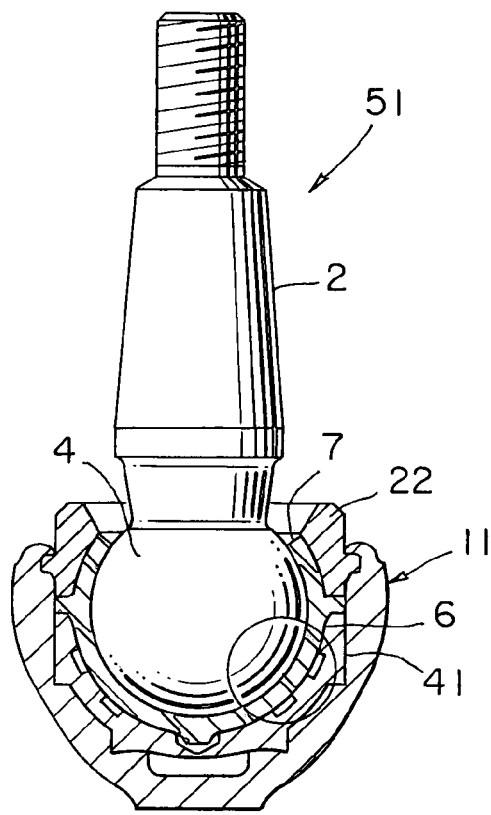
FIG. 5 is a partially sectional front elevation of a subassembly of the ball joint shown in FIG. 1.

Referring to FIG. 3, the inner cup 41 is pressed into the outer cup 31. Then, the bearing 6 is inserted through the housing open part 14 of the housing 11, which has been formed by combining the outer cup 31 and the inner cup 41, into the housing 11. Preferably, a brim part near the bearing open part 7 of the bearing 6 is extended parallel to the axis of the housing 11, as shown in FIG. 3. The curved bottom part 9 of the bearing 6 inserted in the housing 11 is seated on the inner surface of the housing 11, and the flange 8 of the bearing 6 is seated on the step 45 of the housing 11. Since the inside diameter of the housing 11 is slightly smaller than the original outside diameter of the bearing 6, the bearing 6 diametrically contracts slightly when the bearing 6 is inserted into the housing 11. Then, as shown in FIG. 4, the spherical ball part 4 of the ball stud 2 is inserted through the bearing open part 7 in the bearing 6. Subsequently, the retaining ring 22 is inserted in the housing open part 14 of the housing 11, and the brim part near the bearing open part 7 of the bearing 6 is bent radially inward so as to conform to the curved inner surface 25 of the retaining ring 22. The retaining ring 22 is inserted in the housing open part 14 as deep as the flange 23 of the retaining ring 22 is seated on the support surface 44 of the housing 11. Then, the holding part 15 of the housing 11 is bent by pressing (caulked) to complete a subassembly 51 as shown in FIG. 5.

In the subassembly 51, the inside diameter of the inner cup 41 of the housing 11 is slightly smaller than the original outside diameter of the bearing 6. In addition, original thickness of the bearing 6 is greater than difference between the inside diameter of the inner cup 41 of the housing 11 in an assembled state thereof and the outside diameter of the spherical ball part 4.

Figure 6:
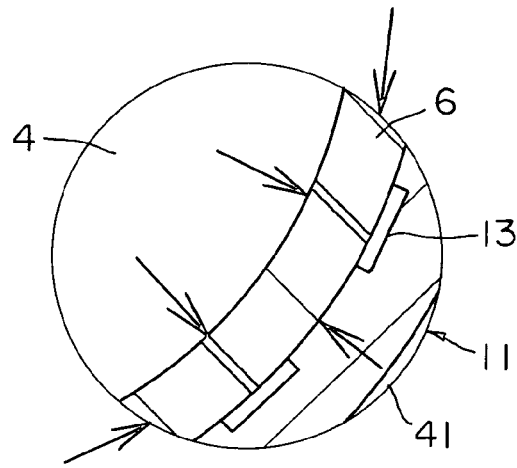
FIG. 6 is an enlarged view of an essential part of the subassembly shown in FIG. 5.

In addition, the bearing open part 7 of the bearing 6 is bent radially inward by the retaining ring 22. Therefore, the bearing 6 is compressed by the spherical ball part 4, the inner cup 41 of the housing 11 and the retaining ring 22. That is, as shown in FIG. 6, the bearing 6 is subjected to circumferential preload, and radial preload acting on the inner and the outer surface thereof.

Then, the subassembly 51 is heated for a predetermined time in a high-temperature oven kept at a high temperature. Since the bearing 6 is made of the synthetic resin and is preloaded by the spherical ball part 4 of the ball stud 2 and the housing 11, when heated in the high-temperature oven, the bearing 6 softens and deforms to enter (protrude) into the grooves 13 formed in the inner surface of the housing 11, as shown in FIG. 2. When Portions of the outer surface of the bearing 6 corresponding to the grooves 13 protrude into the grooves 13 of the housing 11, portions of the inner surface of the bearing 6 corresponding to the protruding portions of the outer surface of the bearing 6 sink toward the housing so as to form gently curved recesses 6a. Consequently, spaces S are formed between the outer surface of the spherical ball part 4 and the inner surface of the bearing 6

Lastly, the large open part 17 of the boot 16 is fitted on the circumferential wall 24 of the retaining ring 22, and the small open part 18 of the boot 16 is firmly fitted on the outer circumferential surface of the shank part 3 of the ball stud 2, so as to complete the ball joint 1 shown in FIG. 1.

In the ball joint 1, the grooves 13 are formed in the inner surface of the housing 11, the bearing 6 deforms to enter (sink) into the grooves 13, and the spaces S are formed between the spherical ball part 4 of the ball stud 2 and the inner surface of the bearing 6. Thus, a contact area between the spherical ball part 4 of the ball stud 2 and the inner surface of the bearing 6 is reduced.

In addition, the bearing 6 made of a synthetic resin softens when subjected to the heat treatment after assembled. Then, the bearing 6 is preloaded by the spherical ball part 4 of the ball stud 2 and the housing 11 and thus easily enters into the grooves 13 of the housing 11.

In addition, in the ball joint 1, the spaces S formed by the gently curved recesses 6a are used as grease reservoirs in which grease is held. Therefore, flow of the grease is not obstructed and thus the grease spreads over a wider area as the ball stud 2 rocks or turns.

In the above ball joint 1, the grooves (recesses) 13 of the housing 11 are circumferential. Thus, the housing 11 can be easily manufactured.

In addition, in the above ball joint 1, the grooves (recesses) 13 of the housing 11 is formed in a portion of the housing 11 on a side opposite to the housing open part 14 (on a side opposite to the shank part 3) with respect to an equator of the spherical ball part 4 of the ball stud 2. Thus, the grease is supplied to a portion on a side opposite to the bearing open part 7 (on the side opposite to the shank part 3) of the inner surface of the bearing, more than supplied to a portion on a side of the bearing open part 7 (on a side of the shank part 3) of the inner surface of the bearing. This manner is effective in a ball joint to which a pressing load may be applied.

Figure 7:
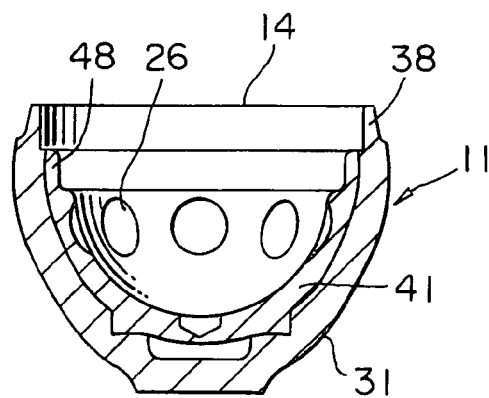
FIG. 7 is a partially sectional front elevation of a housing included in a ball joint in a second embodiment according to the present invention.

A ball joint in a second embodiment according to the present invention will be described with reference to FIG. 7.

The ball joint in the second embodiment includes an inner cup 41 different from that included in the ball joint in the first embodiment and is the same in other respects as the ball joint in the first embodiment. Therefore, description of the components except the inner cup 41 will be omitted.

The inner cup 41 is provided in its inner surface with a plurality of substantially circular depressions (recess-elements) 26. The inner cup 41 is fitted in an outer cup 31 by an open part 48 of the inner cup 41 being pressed in an open part 38 of the outer cup 31. The ball joint is subjected to a heat treatment after assembled.

The bearing 6, similarly to that included in the first embodiment, deforms and enters into the depressions 26 of the inner cup 41 of the housing 11 when the ball joint is heat-treated. Thus, spaces S are formed between the inner surface of the bearing 6 and the spherical ball part 4 of the ball stud 2.

In the second embodiment, although the depressions 26 formed in the inner surface of the housing 11 of the second embodiment are substantially circular, the depressions 26 may have any other shapes. Preferably, the depressions are formed to be spaced apart from each other.

In addition, in the second embodiment, the depressions 26 are formed discretely in the inner surface of the housing 11. Thus, the number and/or the positions of the depressions 26 may be easily adjusted or changed.

Figure 8:
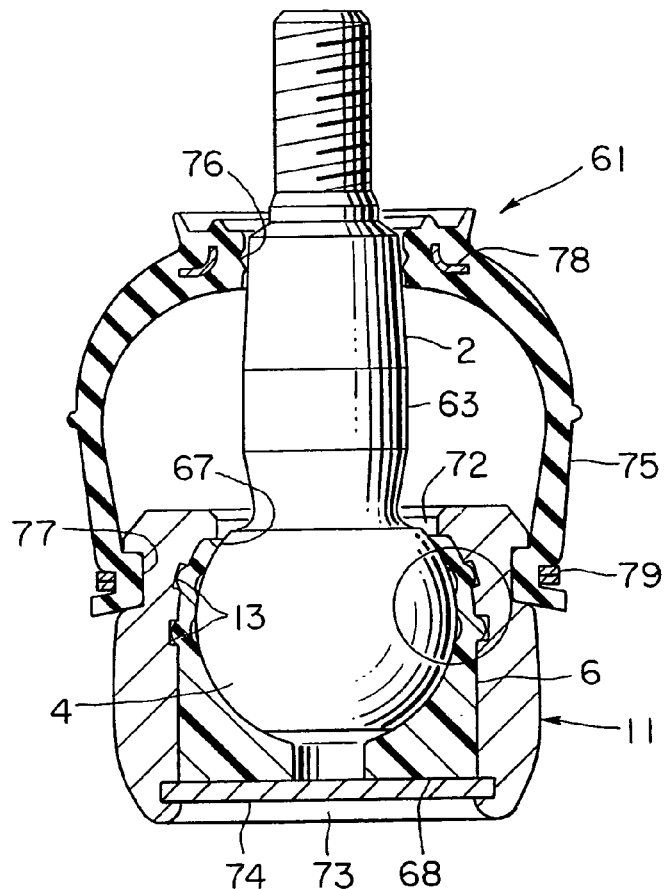
FIG. 8 is a partially sectional front elevation of a housing included in a ball joint in a third embodiment according to the present invention.

Referring to FIG. 8, the ball joint 61 includes: a bail stud 2 having a spherical ball part 4 and a shank part 63 extending from the spherical ball part 4; a bearing 6 cupping the spherical ball part 4 of the ball stud 2 in such a mariner that the spherical ball part 4 is able to turn and rock therein, the bearing 6 having a bearing large open part 67 at one end thereof and a bearing small open part 68 at the other end thereof, a diameter of the bearing small open part 68 being smaller than that of the bearing large open part 67; and a housing 11 cupping the bearing 6 and having a housing small open part 72 at one end thereof and a housing large open part 73, a diameter of the housing large open part 73 being greater than that of the housing small open part 72. The shank part 63 of the ball stud 2 projects through the housing small open part 72 from the housing 6. A substantially disk-shaped bottom plate 74 is placed in the housing large open part 73 of the housing 11 and fastened to the housing 11 by staking (caulking). Then, a small open part 76 reinforced by an internal reinforcing ring 78 having a substantially L-shaped cross section of a dust cover 75 is firmly fitted on an outer circumferential surface of the shank part 63 of the ball stud 2. A large open part 77 of the dust cover 75 is fitted on an outer circumferential surface of the housing 11 and is fastened to the same by means of a circlip 79.

Figure 9:
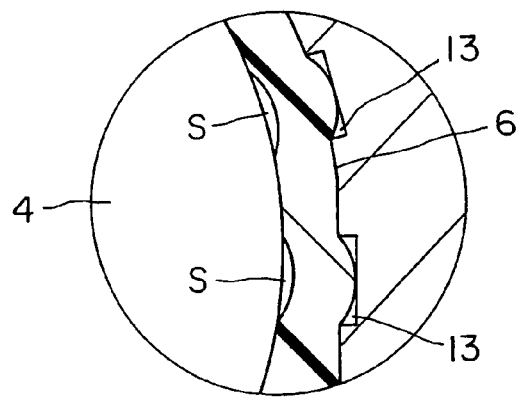
FIG. 9 is an enlarged view of an essential part of the housing shown in FIG. 8.
Figure 10:
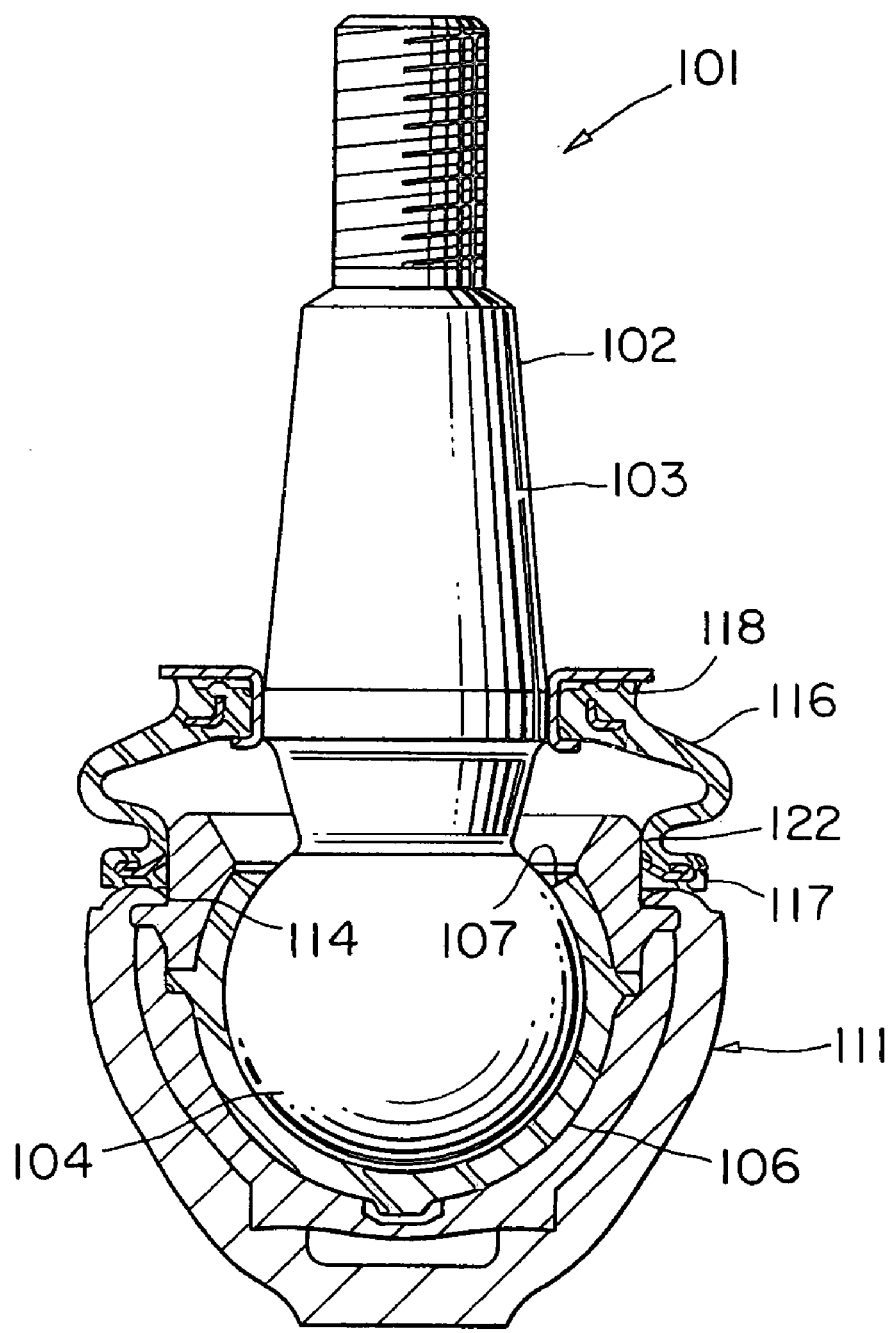
FIG. 10 is a partially sectional front elevation of a conventional ball joint.
Figure 11:
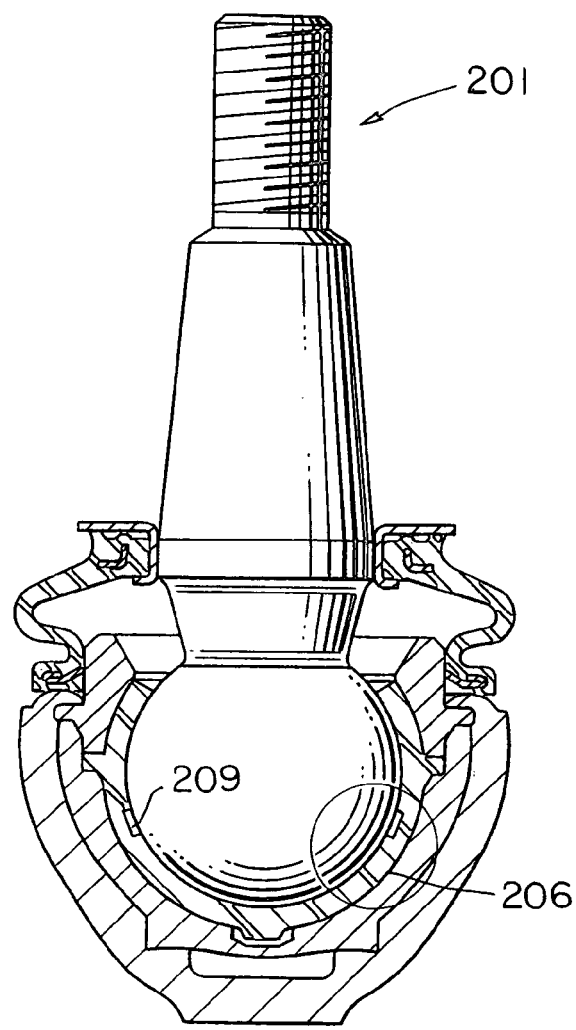
FIG. 11 is a partially sectional front elevation of another conventional ball joint.
Figure 12:
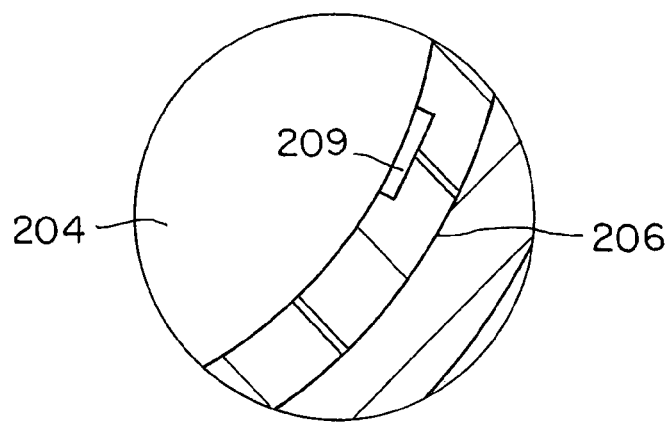
FIG. 12 is an enlarged view of an essential part of the ball joint shown in FIG. 11.

In the above ball joint 61, two circumferential grooves 13 are formed in an inside surface of the housing 11 on a side of the housing small open part 72 (on a side of the shank part 63) with respect to an equator of the spherical ball part 4 of the ball stud 2. Thus, portions of the outer surface of the bearing 6 corresponding to the circumferential grooves 13 deform and enter into the circumferential grooves 13. Therefore, spaces S are formed between the inner surface of the bearing 6 and the spherical ball part 4 of the ball stud 2, as shown in FIG. 9.

That is, in the above ball joint 61, the recesses 13 of the housing 11 are formed on the side of the housing small open part 72 (on the side of the shank part 63) with respect to an equator of the spherical ball part 4 of the ball stud 2, the grease is supplied to a portion on a side of the bearing large open part 67 (on the side of the shank part 63), more than supplied to a portion on a side of the bearing small open part

68 (on the side opposite to the shank part 3). This manner is effective in a ball joint to which a pulling load may be applied.

The invention claimed is:

1. A method of producing a ball joint comprising the steps of:
   assembling a ball stud, a bearing and a housing into a subassembly; the ball stud having a spherical ball part and a shank part extending from the spherical ball part, the housing being provided with a recess in an inner surface thereof, wherein the bearing cups the spherical ball part of the ball stud and the housing holds the bearing therein; and
   conducting a heat treatment to the subassembly whereby the bearing deforms to enter into the recess of the housing and a space is formed between the bearing and the spherical ball part opposite the recess.

2. A method of producing a ball joint according to claim 1, wherein
   during the step of conducting the heat treatment to the subassembly, the bearing expands locally into the recess to separate locally from the spherical ball part and form the space therebetween.

3. A method of producing a ball joint according to claim 1, wherein the bearing is made of a synthetic resin and the housing is made of metal.

4. A method of producing a ball joint according to claim 3, wherein
   the synthetic resin has a higher rate of heat expansion than the metal housing.

5. A method of producing a ball joint according to claim 1, wherein
   the bearing has smooth inner and outer surfaces prior to the heat treatment, and
   during the step of conducting the heat treatment to the subassembly, the bearing is deformed outwardly at the recess to enter the recess and form a hollow at the inner surface which defines the space between the bearing and the spherical ball part.

* * * * *

UNITED STATES PATENT AND TRADEMARK OFFICE
CERTIFICATE OF CORRECTION

PATENT NO. : 7,260,878 B2  Page 1 of 1
APPLICATION NO. : 11/345131
DATED : August 28, 2007
INVENTOR(S) : Yasuhiro Kondoh It is certified that error appears in the above-identified patent and that said Letters Patent is hereby corrected as shown below:

On title page, item 73, Assignee: "Usashi" should read -- Musashi --.

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,260,878 B2 |
| APPLICATION NO. | : 11/345131 |
| DATED | : August 28, 2007 |
| INVENTOR(S) | : Yasuhiro Kondoh |

It is certified that error appears in the above-identified patent and that said Letters Patent is hereby corrected as shown below:

On title page, item 73, Assignee: "Usashi" should read -- Musashi -- and after "Kabushiki" insert -- Kaisha --.

Signed and Sealed this

Seventeenth Day of February, 2009

JOHN DOLL
*Acting Director of the United States Patent and Trademark Office*